US012731736B2

(12) United States Patent
Min et al.

(10) Patent No.: US 12,731,736 B2
(45) Date of Patent: Sep. 8, 2026

(54) MULTILAYERED CAPACITOR

(71) Applicant: SAMSUNG ELECTRO-MECHANICS CO., LTD., Suwon-si (KR)

(72) Inventors: Kyoungki Min, Suwon-si (KR); Hyunwoong Na, Suwon-si (KR); Youngjoon Oh, Suwon-si (KR); Seongmin Park, Suwon-si (KR); Youngkyu Park, Suwon-si (KR); Seula Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 144 days.

(21) Appl. No.: 18/903,701

(22) Filed: Oct. 1, 2024

(65) Prior Publication Data

US 2025/0218684 A1 Jul. 3, 2025

(30) Foreign Application Priority Data

Dec. 27, 2023 (KR) ........................ 10-2023-0192910

(51) Int. Cl.

| | |
|---|---|
| ***H01G 4/30*** | (2006.01) |
| ***H01G 4/008*** | (2006.01) |
| ***H01G 4/012*** | (2006.01) |
| ***H01G 4/12*** | (2006.01) |

(52) U.S. Cl.

CPC ............... *H01G 4/30* (2013.01); *H01G 4/008* (2013.01); *H01G 4/012* (2013.01); *H01G 4/1227* (2013.01)

(58) Field of Classification Search

CPC .......... H01G 4/30; H01G 4/008; H01G 4/012; H01G 4/1227

See application file for complete search history.

(56) References Cited

U.S. PATENT DOCUMENTS

| | | | | |
|---|---|---|---|---|
| 2007/0148422 | A1* | 6/2007 | Schulze | H10D 30/66 428/209 |
| 2014/0290863 | A1* | 10/2014 | Watanabe | H10P 72/72 156/345.52 |
| 2018/0182557 | A1 | 6/2018 | Park et al. | |
| 2018/0286586 | A1* | 10/2018 | Jung | C04B 35/495 |
| 2021/0313097 | A1* | 10/2021 | Tsang | H02H 9/026 |
| 2022/0399165 | A1 | 12/2022 | Kim et al. | |

FOREIGN PATENT DOCUMENTS

| | | | |
|---|---|---|---|
| KR | 10-2018-0076628 | A | 7/2018 |
| KR | 10-2021-0054332 | A | 5/2021 |
| KR | 10-2022-0167599 | A | 12/2022 |

* cited by examiner

*Primary Examiner* — Michael P McFadden

(74) *Attorney, Agent, or Firm* — Morgan, Lewis & Bockius LLP

(57) ABSTRACT

A multilayered capacitor including a capacitor body including a dielectric layer and an internal electrode, and an external electrode disposed outside the capacitor body. The dielectric layer includes a plurality of dielectric grains, and a grain boundary between at least two of the dielectric grains. The grain boundary includes Sn, and the internal electrode includes a compound represented by Chemical Formula 1.

19 Claims, 5 Drawing Sheets

MULTILAYERED CAPACITOR

CROSS-REFERENCE TO RELATED APPLICATION

This application claims priority to and the benefit of Korean Patent Application No. 10-2023-0192910 filed in the Korean Intellectual Property Office on Dec. 27, 2023, the entire contents of which are incorporated herein by reference.

BACKGROUND

(a) Technical Field

The present disclosure relates to a multilayered capacitor.

(b) Description of the Related Art

Recently, as multi-functionalization and miniaturization of electronic devices have been rapidly progressing, miniaturization and performance improvement of electronic components have also been progressing at a rapid pace. Further, the demand for high reliability of electric devices for use in automobiles, network equipment, or the like and electronic components for use in industries has also been increasing significantly.

In order to meet such market demands, competition for technology development of passive components such as inductors, capacitors, or resistors has been accelerating. In particular, great effort has been required to dominate the market by developing various multilayer ceramic capacitor (MLCC) products whose applications and usage as passive components have been continuously increasing.

In addition, a multilayered capacitor is manufactured by stacking dielectric layers and internal electrodes, and is used in various electronic devices such as mobile phones, laptops, and LCD TVs.

With recent technological advancements, multilayered capacitors are required to be miniaturized and have high capacities. To this end, technologies have been developed to increase an effective electrode area by increasing the connectivity of the internal electrodes in contact with the dielectric layer, or to atomize the dielectric material and internal electrode material.

SUMMARY

One aspect of the embodiment provides a multilayered capacitor with excellent electrode connectivity and excellent reliability.

However, the problems that the embodiments seek to solve are not limited to the aforementioned problems and can be expanded in various ways within the scope of the technical ideas included in the embodiments.

A multilayered capacitor according to an embodiment includes a capacitor body including a dielectric layer and an internal electrode, and an external electrode disposed outside the capacitor body, the dielectric layer includes a plurality of dielectric grains, and a grain boundary between at least two of the dielectric grains, the grain boundary includes Sn, and the internal electrode includes a compound represented by Chemical Formula 1.

$M_{n+1}SnX_n$ [Chemical Formula 1]

in Chemical Formula 1,

M includes Ti, Zr, Hf, Sc, Cr, V, Nb, Ta, Mo, Mn, or a combination thereof,

X includes C, N, or a combination thereof, and n is an integer from 1 to 4.

M may include Ti, Zr, Hf, Nb, or a combination thereof.

The compound represented by Chemical Formula 1 may include $Ti_2SnC$, $Zr_2SnC$, $Nb_2SnC$, $Hf_2SnC$, $Hf_2SnN$, $Ti_3SnC_2$, or a combination thereof.

A Sn content of the grain boundary may be about 0.01 at % to about 0.5 at %.

At least one dielectric grain among the plurality of dielectric grains include a main component and a subcomponent, the main component may include $Ba_mTiO_3$ ($0.995 \le m \le 1.010$), $(Ba_{1-x}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), or a combination thereof.

The subcomponent may include dysprosium (Dy), manganese (Mn), vanadium (V), silicon (Si), aluminum (Al), barium (Ba), magnesium (Mg), antimony (Sb), germanium (Ge), and gallium. (Ga), indium (In), lanthanum (La), chromium (Cr), hafnium (Hf), yttrium (Y), actinium (Ac), cerium (Ce), praseodymium (Pr), neodium (Nd), promethium (Pm), samarium (Sm), europium (Eu), gadolinium (Gd), terbium (Tb), holmium (Ho), erbium (Er), thulium (Tm), ytterbium (Yb), lutetium (Lu), or a combination thereof.

An average thickness of the internal electrode may be about 0.05 μm to about 1 μm.

An average thickness of the dielectric layer may be about 0.5 μm to about 5 μm.

A multilayered capacitor according to another embodiment includes a capacitor body including a dielectric layer and an internal electrode, and an external electrode disposed outside the capacitor body, the dielectric layer includes a plurality of dielectric grains, and a grain boundary between at least two of the dielectric grains, the grain boundary includes Sn, the grain boundary or at least one dielectric grain among the plurality of dielectric grains includes a main component and a subcomponent, and the internal electrode includes a compound represented by Chemical Formula 1.

$M_{n+1}SnX_n$ [Chemical Formula 1]

in Chemical Formula 1,

M includes Ti, Zr, Hf, Sc, Cr, V, Nb, Ta, Mo, Mn, or a combination thereof,

X includes C, N, or a combination thereof, and n is an integer from 1 to 4.

M may include Ti, Zr, Hf, Nb, or a combination thereof.

The compound represented by Chemical Formula 1 may include $Ti_2SnC$, $Zr_2SnC$, $Nb_2SnC$, $Hf_2SnC$, $Hf_2SnN$, $Ti_3SnC_2$, or a combination thereof.

A Sn content of the grain boundary may be about 0.01 at % to about 0.5 at %.

The main component may include $Ba_mTiO_3$ ($0.995 \le m \le 1.010$), $(Ba_{1-x}Ca_x)_m(Ti_{1-y}Zr_y)O_3$ ($0.995 \le m \le 1.010$, $0 \le x \le 0.10$, $0 < y \le 0.20$), $Ba_m(Ti_{1-x}Zr_x)O_3$ ($0.995 \le m \le 1.010$, $x \le 0.10$), or a combination thereof.

The subcomponent may include dysprosium (Dy), manganese (Mn), vanadium (V), silicon (Si), aluminum (Al), barium (Ba), magnesium (Mg), antimony (Sb), germanium (Ge), and gallium. (Ga), indium (In), lanthanum (La), chromium (Cr), hafnium (Hf), yttrium (Y), actinium (Ac), cerium (Ce), praseodymium (Pr), neodium (Nd), promethium (Pm), samarium (Sm), europium (Eu), gadolinium (Gd), terbium (Tb), holmium (Ho), erbium (Er), thulium (Tm), ytterbium (Yb), lutetium (Lu), or a combination thereof.

An average thickness of the internal electrode may be about 0.05 μm to about 1 μm.

An average thickness of the dielectric layer may be about 0.5 μm to about 5 μm.

The grain boundary may include the main component and the subcomponent.

M may include Ti, and X may include C.

The compound represented by Chemical Formula 1 may include $Ti_2SnC$.

The multilayered capacitor according to the embodiment has the advantage of excellent electrode connectivity and reliability.

However, the various and beneficial advantages and effects of the present disclosure are not limited to the aforementioned descriptions, and may be more easily understood in the process of explaining specific embodiments of the present disclosure.

BRIEF DESCRIPTION OF THE DRAWINGS

FIG. 4 is a scanning electron microscope (SEM) image of a portion of a cross section of a multilayered capacitor according to an embodiment.

DETAILED DESCRIPTION

Figure 1:
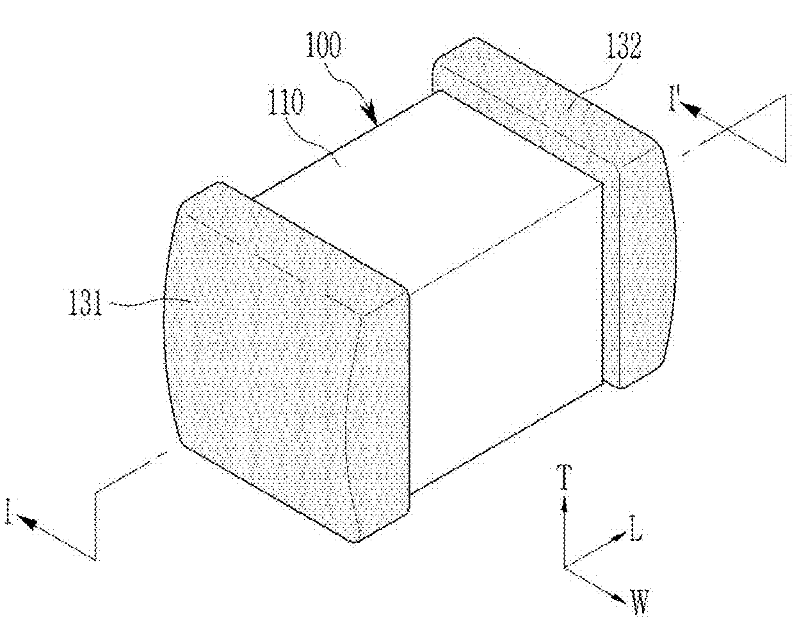
FIG. 1 is a perspective view showing a multilayered capacitor according to an embodiment.

Hereinafter, example embodiments of the present disclosure will be described in detail with reference to the accompanying drawings such that those skilled in the art can easily implement them. The drawings and description are to be regarded as illustrative in nature and not restrictive. Like reference numerals designate like elements throughout the specification. Further, the accompanying drawings are provided for helping to easily understand embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element, or face the other constituent element, or intervening other constituent elements may be present. In contrast, when a constituent element is referred to as being "directly connected" or "directly coupled" to another constituent element, it will be appreciated that there are no intervening other constituent elements present.

In the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Accordingly, unless explicitly described to the contrary, the word "comprise," and variations such as "comprises" or "comprising," will be understood to imply the inclusion of stated elements but not the exclusion of any other elements.

Figure 2:
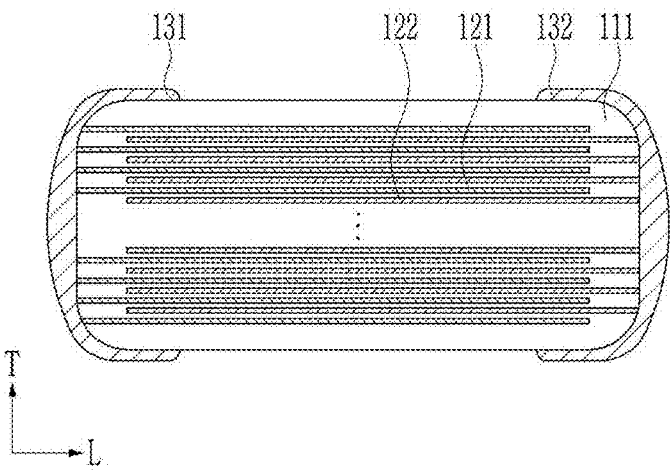
FIG. 2 is a cross-sectional view of the multilayered capacitor taken along line I-I' in FIG. 1.
Figure 3:
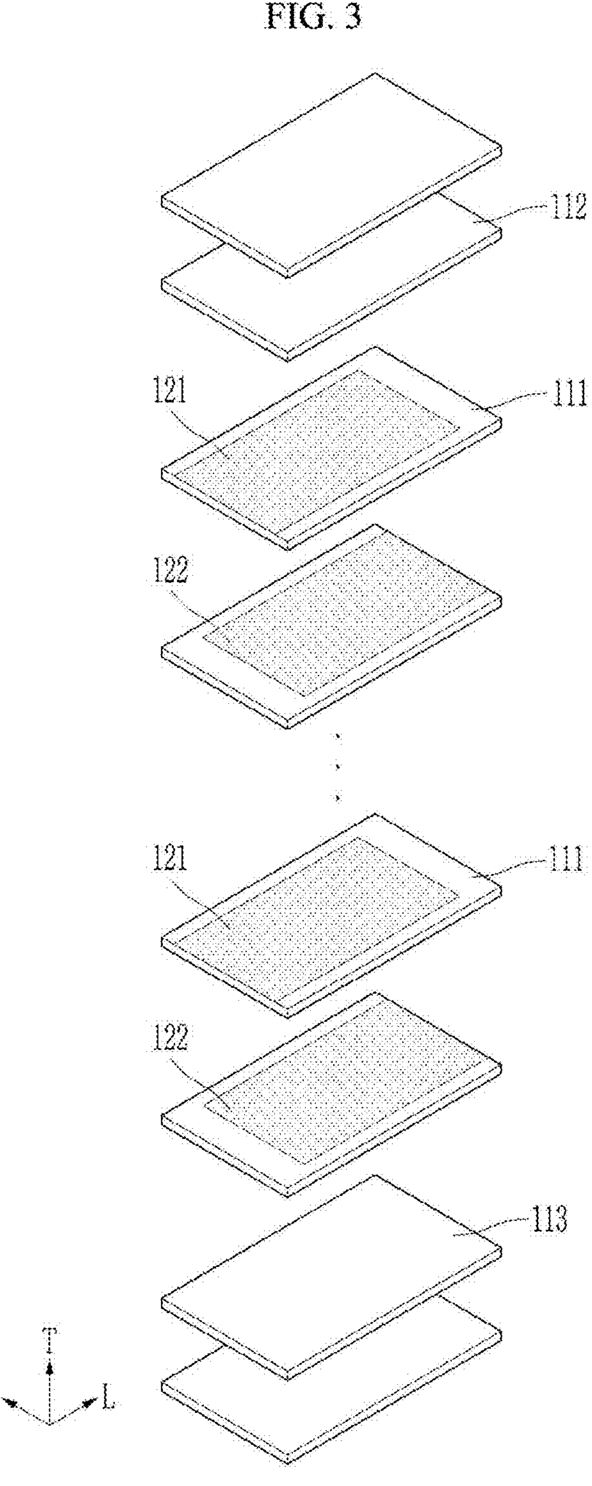
FIG. 3 is an exploded perspective view showing the stacking of internal electrodes in the capacitor body illustrated in FIG. 1.

FIG. 1 is a perspective view showing a multilayered capacitor 100 according to an embodiment, FIG. 2 is a cross-sectional view of the multilayered capacitor 100 taken along line I-I' in FIG. 1, and FIG. 3 is an exploded perspective view showing the stacking of internal electrodes in the capacitor body 110 illustrated in FIG. 1.

To clearly describe the present embodiment, directions are defined as follow: the L axis, the W axis, and the T axis shown in the drawings represent the longitudinal direction, width direction, and thickness direction of the capacitor body 110, respectively. Herein, the thickness direction (T-axis direction) may be a direction perpendicular to wide surfaces (main surfaces) of sheet-shaped constituent elements, and may be used, for example, as the same concept as the stacking direction in which dielectric layers 111 are stacked. The longitudinal direction (L-axis direction) may be a direction extending in parallel with the wide surfaces (main surfaces) of the sheet-shaped constituent elements and be a direction appropriately perpendicular to the thickness direction (T-axis direction), and may be, for example, a direction in which a first external electrode 131 and a second external electrode 132 are positioned on both sides. The width direction (W-axis direction) may be a direction extending in parallel with the wide surfaces (main surfaces) of the sheet-shaped constituent elements and be a direction appropriately perpendicular to the thickness direction (T-axis direction) and the longitudinal direction (L-axis direction), and the lengths of the sheet-shaped constituent elements in the longitudinal direction (L-axis direction) may be longer than their lengths in the width direction (W-axis direction).

Referring to FIGS. 1 to 3, the multilayered capacitor 100 according to the embodiment may include the capacitor body 110, and the first external electrode 131 and the second external electrode 132 that are disposed on both ends of the capacitor body 110 facing each other in the longitudinal direction (L-axis direction).

The capacitor body 110 may have, for example, an approximate hexahedral shape.

In the present embodiment, for ease of explanation, in the capacitor body 110, two surfaces facing each other in the thickness direction (T-axis direction) are defined as a first surface and a second surface, and two surfaces that are coupled to the first surface and the second surface and face each other in the longitudinal direction (L-axis direction) are defined as a third surface and a fourth surface, and two surfaces that are coupled to the first surface and the second surface, are coupled to the third surface and the fourth surface, and face each other in the width direction (W-axis direction) are defined as a fifth surface and a sixth surface.

As an example, the first surface which is the lower surface may be a surface oriented to the mounting direction. Further, the first surface to the sixth surface may be flat; however, the present embodiment is not limited thereto, and for example, the first surface to the sixth surface may be curved surfaces with convex center portions, and the border of each surface, i.e., the edge may be rounded.

The shape and dimensions of the capacitor body 110 and the number of dielectric layers 111 that are stacked are not limited to those shown in the drawings of the present embodiment.

The capacitor body 110 is formed by stacking a plurality of dielectric layers 111 in the thickness direction (T-axis direction) and sintering them, and includes the plurality of dielectric layers 111, and first internal electrodes 121 and second internal electrodes 122 that are alternately disposed in the thickness direction (T-axis direction) with the dielectric layers 111 interposed therebetween.

In this case, adjacent dielectric layers 111 in the capacitor body 110 may be so integrated that it is difficult to see the boundaries between the dielectric layers without the use of a scanning electron microscope (SEM).

Further, the capacitor body 110 may include an active region and cover regions 112 and 113.

The active region is a portion that contributes to the formation of the capacitance of the multilayered capacitor 100. As an example, the active region may be the region where the first internal electrodes 121 and the second internal electrodes 122 that are stacked along the thickness direction (T-axis direction) overlap.

The cover regions 112 and 113 are margin portions in the thickness direction, and may be positioned on the first surface side and second surface side of the active region in the thickness direction (T-axis direction). These cover regions 112 and 113 may be stacked on the upper surface and lower surface of the active region, respectively, and each may consist of a single dielectric layer 111 or two or more dielectric layers 111.

Also, the capacitor body 110 may further include side cover regions. The side cover regions are margin portions in the width direction, and may be positioned on the fifth surface side and sixth surface side of the active region in the width direction (W-axis direction), respectively. These side cover regions may be formed by stacking dielectric green sheets with conductive paste layers for forming internal electrodes and sintering them. When the conductive paste layers are formed on the surfaces of the dielectric green sheets, the conductive paste may be coated only on some portions of the surfaces of the dielectric green sheets and may not be coated on both side surfaces of the surfaces of the dielectric green sheets.

The cover regions 112 and 113 and the side cover regions serve to prevent damage to the first internal electrodes 121 and the second internal electrodes 122 by physical or chemical stress.

Internal Electrode

The first internal electrodes 121 and the second internal electrodes 122 are electrodes with different polarities, and may be alternately disposed along the T-axis direction such that a first internal electrode and a second internal electrode adjacent to each other with a dielectric layer 111 interposed therebetween face each other, and one end of each internal electrode may be exposed from the third and fourth surfaces of the capacitor body 110.

The first internal electrodes 121 and the second internal electrodes 122 may be electrically insulated from each other by the dielectric layers 111 disposed therebetween.

The end portions of the first internal electrodes 121 and the second internal electrodes 122 that are alternately exposed from the third and fourth surfaces of the capacitor body 110 may be electrically coupled to the first external electrode 131 and the second external electrode 132, respectively.

In an embodiment, the internal electrodes 121 and 122 include a compound represented by Chemical Formula 1.

$$M_{n+1}SnX_n \quad \text{[Chemical Formula 1]}$$

In Chemical Formula 1,

M includes Ti, Zr, Hf, Sc, Cr, V, Nb, Ta, Mo, Mn, or a combination thereof, X includes C, N, or a combination thereof, n is an integer from 1 to 4. As an example, M may include Ti, Zr, Hf, Nb, or a combination thereof.

The compound represented by Chemical Formula 1 may be a MAX phase compound including Sn.

The MAX phase compound is a compound that have both metallic and ceramic properties, and are characterized by excellent electrical conductivity and a low coefficient of thermal expansion.

The MAX phase compound has a higher sintering temperature than metals such as Ni, and thus there may not be a significant difference between the sintering temperature and the dielectric material of the dielectric layer 111. Accordingly, when the internal electrodes 121 and 122 including the MAX phase compound and the dielectric layer 111 are sintered together, mismatching problems with the dielectric layer 111 do not occur, and thus electrode connectivity may be significantly improved by preventing disconnection or thickness expansion of the internal electrodes 121 and 122.

In addition, conventionally, a sintering aid has been added when manufacturing the internal electrodes 121 and 122 to reduce the sintering temperature difference between the internal electrodes 121 and 122 and the dielectric layer 111. In this case, the sintering aid spread in the direction of the dielectric layer 111 during the sintering process, thereby increasing the thickness of the dielectric layer 111.

However, when using the MAX phase compound as a material for the internal electrodes 121 and 122, a sintering aid may not be used, thereby preventing thickness expansion of the dielectric layer 111, and thus reducing the size of the multilayered capacitor 100 in the T-axis direction (thickness direction).

In the multilayered capacitor 100 according to an embodiment, the MAX phase compound is added to the conductive paste for internal electrodes, and the compound represented by Chemical Formula 1 is included in the internal electrodes 121 and 122 after sintering, and thereby the aforementioned effect can be achieved.

As a specific example, the compound represented by Chemical Formula 1 may include $Ti_2SnC$, $Zr_2SnC$, $Nb_2SnC$, $Hf_2SnC$, $Hf_2SnN$, $Ti_3SnC_2$, or a combination thereof.

As an example, the internal electrodes 121 and 122 may further include a conductive metal, and the conductive metal may further include a metal such as Ni, Cu, Ag, Pd, or Au, or an alloy thereof, such as an Ag—Pd alloy.

Also, the first internal electrodes 121 and the second internal electrodes 122 may include dielectric particles of the same composition system as that of the ceramic material that is included in the dielectric layers 111.

The first internal electrodes 121 and the second internal electrodes 122 may be formed using conductive paste including a conductive metal. The printing method of the conductive paste may use a screen printing method, a gravure printing method, or the like.

As an example, average thicknesses of the first internal electrodes 121 and the second internal electrodes 122 may be greater than or equal to about 0.05 μm, greater than or equal to about 0.1 μm, greater than or equal to about 0.2 μm, or greater than or equal to about 0.25 μm, and less than or equal to about 1 μm or less than or equal to about 0.5 μm.

The average thickness of the first internal electrode 121 or second internal electrode 122 can be measured by the following method.

First, the multilayered capacitor 100 is placed in an epoxy mixture and cured, and the L-axis and T-axis direction sides of the capacitor body 110 are polished to ½ the point in a W-axis direction, then placed in a vacuum atmosphere chamber, and then, cut in the L-axis direction and the T-axis direction from the center of the W-axis direction of the capacitor body 110 to prepare a cross-sectional sample (hereinafter referred to as "cross-sectional sample").

It may be an arithmetic mean value of the thicknesses of the first internal electrode 121 or second internal electrode 122 at 10 points spaced at predetermined intervals from a reference point in the scanning electron microscope (SEM) of the cross-sectional sample, when the center point in the L-axis direction or W-axis direction of the first internal electrode 121 or second internal electrode 122 is used as a reference point.

The intervals between the 10 points may be adjusted according to the scale of the SEM image, and may be, for example, an interval of about 1 μm to about 100 μm, about 1 μm to about 50 μm, or about 1 μm to about 10 μm.

In this case, all 10 points should be located within the first internal electrode 121 or the second internal electrode 122, and when all 10 points are not located within the first internal electrode 121 or the second internal electrode 122, the position of the reference point may be changed or the interval of 10 points may be adjusted. Other methods and/or tools appreciated by one of ordinary skill in the art, even if not described in the present disclosure, may also be used.

Dielectric Layer

In an embodiment, the dielectric layer 111 includes a plurality of dielectric grains; and a grain boundary between at least two of the dielectric grains, wherein the grain boundary includes Sn (tin).

When manufacturing the multilayered capacitor 100 according to an embodiment, when the conductive paste for forming an internal electrode layer including the aforementioned MAX phase compound including Sn is coated on a dielectric green sheet and sintered, Sn may be partially decomposed in the MAX phase compound and diffuse into the dielectric layer 111. The diffused Sn may exist at a dielectric grain boundary within the dielectric layer 111, which can improve the reliability of the multilayered capacitor 100 by preventing excessive crystal grain growth of dielectric grains.

The presence and content of Sn included in the dielectric grain boundaries can be measured by the following method.

Figure 4:
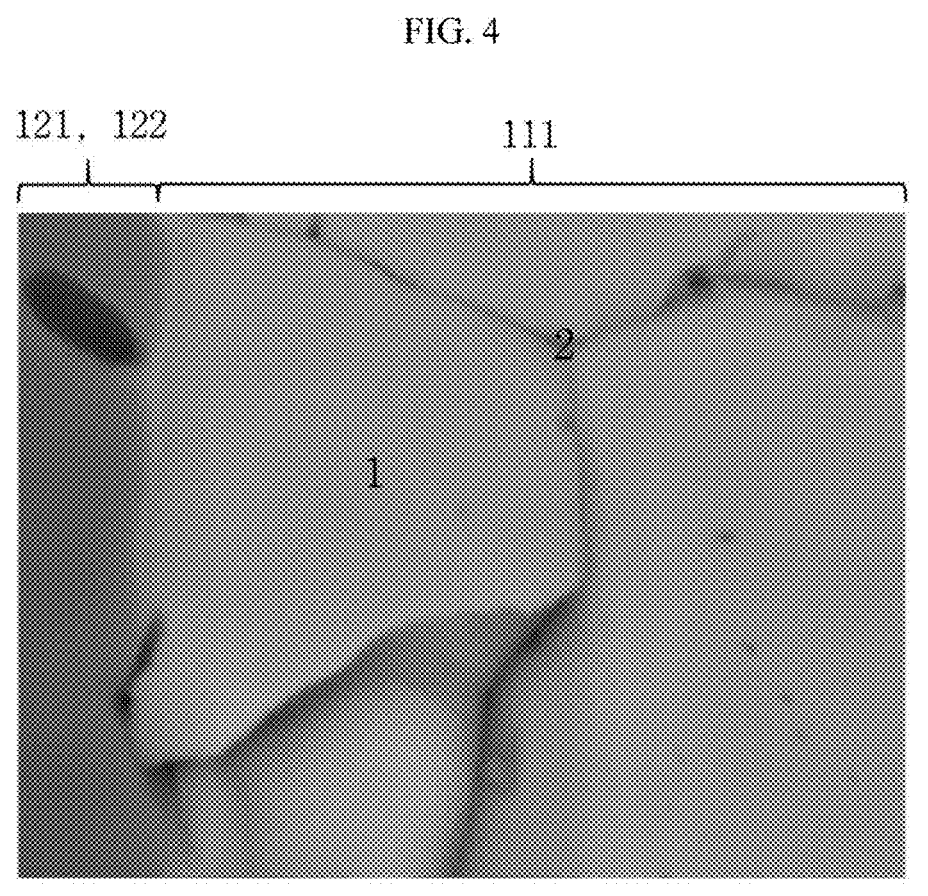

First, the cross-sectional sample is observed with a scanning electron microscope (SEM) to prepare an SEM image as shown in FIG. 4. Referring to FIG. 4, by using a method such as binarizing the SEM image of a cross-sectional sample, the grain boundary, which is the boundary of the dielectric grain, can be confirmed by distinguishing a portion with a difference in light and dark.

Next, the presence of Sn can be confirmed by selecting a random grain boundary in the SEM image and performing SEM-EDS analysis at that location.

Figure 5A:
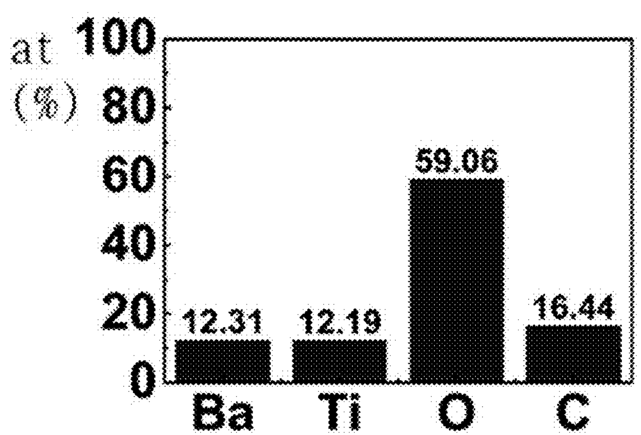
FIG. 5A is a graph showing the content (atomic %) of elements at the dielectric grain at position 1 shown in FIG. 4.
Figure 5B:
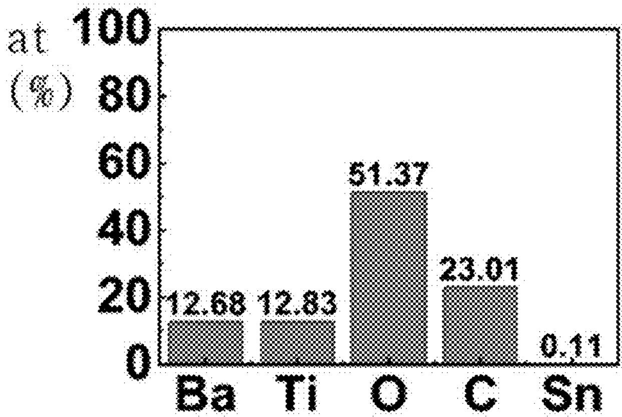
FIG. 5B is a graph showing the content (atomic %) of elements at the grain boundary at position 2 shown in FIG. 4.

FIG. 5A is a graph showing the content (atomic %) of elements at the dielectric grain at position 1 shown in FIG. 4. FIG. 5B is a graph showing the content (atomic %) of elements at the grain boundary at position 2 shown in FIG. 4.

Referring to FIG. 5, the content of elements included in the dielectric grains and the grain boundaries can be confirmed, and referring to FIG. 5(*b*), it can be confirmed that Sn is observed in the grain boundaries.

In an embodiment, the Sn content (atomic %; at %) for the grain boundary may be greater than or equal to about 0.01 at %, greater than or equal to about 0.05 at %, or greater than or equal to about 0.1 at %, and less than or equal to about 0.5 at %, less than or equal to about 0.4 at %, or less than or equal to about 0.25 at %.

If the Sn content in the grain boundaries is less than about 0.01 at %, Sn may not be sufficiently included in the grain boundaries, and thus the effect of improving the reliability of the capacitor may be minimal, and if it is greater than about 0.5 at %, growth of dielectric grains may be excessively suppressed.

The Sn content (at %) for the grain boundaries may be an arithmetic mean value determined by selecting three grain boundaries between different dielectric grains, selecting three-point positions at equal intervals at each selected grain boundary, and measuring the Sn content at a total of 9 points.

The dielectric grains include a main component and a subcomponent. In an embodiment, the dielectric grain boundary may further include a main component and a subcomponent.

The main component is the parent material of the dielectric, has a high dielectric constant, and contributes to the formation of the dielectric constant of the multilayered capacitor 100.

As an example, the main component may be a dielectric material including $Ba_mTiO_3$ (wherein $0.995 \leq m \leq 1.010$), $(Ba_{1-x}Ca_x)_m(Ti_{1-y}Zr_y)O_3$ (wherein $0.995 \leq m \leq 1.010$, $0 \leq x \leq 0.10$, and $0 < y \leq 0.20$), $Ba_m(Ti_{1-x}Zr_x)O_3$ (wherein $0.995 \leq m \leq 1.010$ and $x \leq 0.10$), $(Ba_{1-x}Ca_x)_m(Ti_{1-y}Sn_y)O_3$ (wherein $0.995 \leq m \leq 1.010$, $0 \leq x \leq 0.10$ and $0 < y \leq 0.20$), or a combination thereof.

As an example, the main component may be a dielectric material including $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), or a combination thereof.

As an example, the main component may include $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

For example, the subcomponent may include dysprosium (Dy), manganese (Mn), vanadium (V), silicon (Si), aluminum (Al), barium (Ba), magnesium (Mg), tin (Sn), antimony (Sb), germanium (Ge), and gallium (Ga), indium (In), lanthanum (La), chromium (Cr), hafnium (Hf), yttrium (Y), actinium (Ac), cerium (Ce), praseodymium (Pr), neodium (Nd), promethium (Pm), samarium (Sm), europium (Eu), gadolinium (Gd), terbium (Tb), holmium (Ho), erbium (Er), thulium (Tm), ytterbium (Yb), lutetium (Lu), or a combination thereof.

The dielectric layer 111 may further include a ceramic additive, an organic solvent, a binder, a dispersant, or a combination thereof.

For example, the average thickness of the dielectric layer 111 may be greater than or equal to about 0.5 μm or greater than or equal to about 1.0 μm, and less than or equal to about 5 μm or less than or equal to about 3 μm.

The average thickness of the dielectric layer 111 may be measured by the following method.

First, a scanning electron microscope (SEM) image obtained by observing a cross-sectional sample with a scanning electron microscope is prepared.

It may be an arithmetic mean value of the thicknesses of dielectric layer 111 at 10 points spaced at predetermined intervals from a reference point in the SEM image of the cross-sectional sample, when the center point in the L-axis direction or W-axis direction of dielectric layer 111 is used as a reference point.

The intervals between the 10 points may be adjusted according to the scale of the SEM image, and may be, for example, an interval of about 1 μm to about 100 μm, about 1 μm to about 50 μm, or about 1 μm to about 10 μm.

In this case, all 10 points should be located within the dielectric layers 111, and when all 10 points are not located within the dielectric layers 111, the position of the reference point may be changed or the interval of 10 points may be adjusted. Other methods and/or tools appreciated by one of ordinary skill in the art, even if not described in the present disclosure, may also be used.

External Electrode

The first external electrode 131 and the second external electrode 132 may receive voltages of different polarities, and may be electrically connected to the exposed portions of the first internal electrodes 121 and the second internal electrodes 122, respectively.

According to the above configuration, when a predetermined voltage is applied between the first external electrode 131 and the second external electrode 132, charge is accumulated between the first internal electrodes 121 and the second internal electrodes 122 facing each other. At this time, the capacitance of the multilayered capacitor 100 becomes proportional to the overlapped area of the first internal electrodes 121 and the second internal electrodes 122 overlapping each other along the T-axis direction in the active region.

The first external electrode 131 and the second external electrode 132 may be disposed on the third and fourth surfaces of the capacitor body 110, respectively, and may include first and second connection portions, respectively, that are coupled to the first internal electrodes 121 and the second internal electrodes 122, respectively, and include first and second band portions, respectively, that are disposed at the edges where the third and fourth surfaces of the capacitor body 110 meet either the first and second surfaces or the fifth and sixth surfaces.

The first and second band portions may extend from the first and second connection portions to some points of either the first and second surfaces or fifth and sixth surfaces of the capacitor body 110. The first and second band portions may serve to improve the adhesion strength of the first external electrode 131 and the second external electrode 132.

As an example, each of the first external electrode 131 and the second external electrode 132 may include a sintered metal layer that is in contact with the capacitor body 110, a conductive resin layer that is disposed to cover the sintered metal layer, and a plating layer that is disposed to cover the conductive resin layer.

The sintered metal layer may include a conductive metal and glass.

As an example, the sintered metal layer may include, as the conductive metal, copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, copper (Cu) may include a copper (Cu) alloy. When the conductive metal includes copper, metals other than copper may be included in the amount of less than or equal to about 5 parts by mole based on 100 parts by mole of copper.

As an example, the sintered metal layer may include a composition including oxides as glass, and may include, for example, one or more selected from silicon oxides, boron oxides, aluminum oxides, transition metal oxides, alkali metal oxides, and alkaline earth metal oxides. The transition metal may be selected from zinc (Zn), titanium (Ti), copper (Cu), vanadium (V), manganese (Mn), iron (Fe), and nickel (Ni), and the alkali metal may be selected from lithium (Li), sodium (Na), and potassium (K), and the alkaline earth metal may be one or more selected from magnesium (Mg), calcium (Ca), strontium (Sr), and barium (Ba).

Optionally, the conductive resin layer is formed on the sintered metal layer, and for example, may be formed to completely cover the sintered metal layer. Meanwhile, the first external electrode 131 and the second external electrode 132 may not include a sintered metal layer, and in this case, the conductive resin layer may be in direct contact with the capacitor body 110.

The conductive resin layers may extend to the first and second surfaces or fifth and sixth surfaces of the capacitor body 110, and the lengths of regions (i.e., band portions) where the conductive resin layers extend to the first and second surfaces or fifth and sixth surfaces of the capacitor body 110 may be longer than the lengths of regions (i.e., band portions) where the sintered metal layers extend in the first and second surfaces or fifth and sixth surfaces of the capacitor body 110. In other words, the conductive resin layers may be formed on the sintered metal layers, and may be formed so as to completely cover the sintered metal layers.

The conductive resin layers include a resin and a conductive metal.

The resin which is included in the conductive resin layers is not particularly limited as long as it has a bonding property and an impact absorption property and can be mixed with conductive metal powder to form a paste, and may include, for example, a phenolic resin, an acrylic resin, a silicone resin, an epoxy resin, or a polyimide resin.

The conductive metal that is included in the conductive resin layers serves to electrically connect the conductive resin layers to the first internal electrode 121 and the second internal electrode 122, or the sintered metal layer.

The conductive metal that is included in the conductive resin layer may have a spherical shape, a flake shape, or a combination thereof. In other words, the conductive metal may be formed only in a flake shape, or may be formed only in a spherical shape, or may be the form of a mixture of a flake shape and a spherical shape.

Herein, the spherical shape may include a shape which is not completely spherical, and may include, for example, a shape in which a ratio of the length of the major axis to the length of the minor axis (major axis/minor axis) may be less than or equal to about 1.45. The flake-type powder refers to a powder with a flat and elongated shape, and is not particularly limited, but for example, a ratio of the length of the major axis to the length of the minor axis (major axis/minor axis) may be greater than or equal to about 1.95.

The first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb) which may be included alone or alloys thereof. As an example, each plating layer may be a nickel (Ni) plating layer or a tin (Sn) plating layer, or may be a form in which a nickel (Ni) plating layer and a tin (Sn) plating layer are sequentially stacked, or may be a form in which a tin (Sn) plating layer, a nickel (Ni) plating layer, and a tin (Sn) plating layer are sequentially stacked. Alternatively, each plating layer may include a plurality of nickel (Ni) plating layers and/or a plurality of tin (Sn) plating layers.

The plating layer can improve mountability to the substrate, structural reliability, durability to the outside, heat resistance, and equivalent series resistance (ESR) of the multilayered capacitor 100.

Method of Manufacturing Multilayered Capacitor

A method of manufacturing the multilayered capacitor according to another embodiment includes manufacturing a capacitor body including a dielectric layer and an internal electrode and then, forming an external electrode on the outside of the capacitor body.

First, the manufacturing the capacitor body is illustrated.

In the manufacturing process of the capacitor body, a dielectric paste, which will be formed into a dielectric layer after sintering, and a conductive paste, which will be formed into an internal electrode after the sintering, are prepared.

The dielectric paste is, for example, prepared in the following method. Dielectric powders are uniformly mixed through wet mixing and the like, dried, and heat-treated under predetermined conditions obtain plasticized powder. Subsequently, an organic vehicle or an aqueous vehicle is added to the plasticized powder and additionally, kneaded to prepare the dielectric paste.

The obtained dielectric paste is formed into a dielectric green sheet by using a technique such as the doctor blade method. Additionally, the dielectric paste may include additives selected from various dispersants, plasticizers, dielectrics, subcomponent compounds, or glass, if necessary.

The conductive paste for internal electrodes is prepared by mixing a compound represented by Chemical Formula 1 with a binder or solvent.

$M_{n+1}SnX_n$ [Chemical Formula 1]

In Chemical Formula 1,

M includes Ti, Zr, Hf, Sc, Cr, V, Nb, Ta, Mo, Mn, or a combination thereof,

X includes C, N, or a combination thereof, and n is an integer from 1 to 4.

Because the compound represented by Chemical Formula 1 is the same as described above, its description is omitted here.

The conductive paste for an internal electrode is coated with a predetermined pattern on the dielectric green sheet surface in various printing methods such as screen printing or transfer methods, etc. Subsequently, the dielectric green sheets with the internal electrode pattern in plural are stacked and then, pressed in a stacking direction to obtain a dielectric green sheet laminate. Herein, the internal electrode patterns may be stacked so that the dielectric green sheet laminate may have a dielectric green sheet at the top and at the bottom in the stacking direction.

Optionally, the obtained dielectric green sheet laminate may be cut into a predetermined size by dicing or the like.

In addition, the dielectric green sheet laminate, if necessary, may be solidified and dried to remove the plasticizer and the like and then, barrel-polished by using a horizontal centrifugal barrel machine, etc. In the barrel-polishing, unnecessary parts such as burrs, etc., which are generated during the cutting, may be polished by inserting the dielectric green sheet laminate with media and a polishing solution into a barrel container and then, applying rotational motion, vibration, or the like to the barrel container. In addition, after the barrel-polishing, the dielectric green sheet laminate may be washed with a cleaning solution such as water and the like and dried.

The dielectric green sheet laminate is subjected to binder removal and sintering treatments to obtain a capacitor body.

The binder removal treatment is performed under conditions appropriately adjusted according to a main component composition of the dielectric layer and a main component composition of the internal electrode. For example, the binder removal treatment is performed by increasing a temperature at about 5° C./hour to about 300° C./hour and maintained at a support temperature of about 180° C. to about 400° C. for about 0.5 hour to about 24 hours. The binder removal is performed under an air or reducing atmosphere.

The sintering treatment may be performed under conditions appropriately adjusted according to a main component composition of the dielectric layer or a main component composition of the internal electrode. For example, the sintering treatment may be performed at about 1200° C. to about 1350° C. or about 1220° C. to about 1300° C. for about 0.5 hour to about 8 hours or about 1 hour to about 3 hours. The sintering treatment is performed under a reducing atmosphere, for example, under an atmosphere in which a mixed gas of nitrogen gas ($N_2$) and hydrogen gas ($H_2$) is humidified.

After the sintering treatment, annealing may be performed. Because the annealing is a treatment to reoxidize the dielectric layer, if the sintering is performed under the reducing atmosphere, the annealing may be performed. The annealing treatment is performed under conditions appropriately adjusted according to a main component composition of the dielectric layer and the like. For example, the annealing treatment may be performed at about 950° C. to about 1150° C. for about 0 hour to about 20 hours at about 50° C./hour to about 500° C./hour. In addition, the annealing may be performed under a humidified nitrogen gas ($N_2$) atmosphere at an oxygen partial pressure of about $1.0\times10^{-9}$ MPa to about $1.0\times10^{-5}$ MPa.

The humidifying nitrogen gas, mixed gas, or the like in the binder removal treatment, the sintering treatment, or the annealing treatment may be performed, for example, by using a wetter and the like, wherein a temperature of water used therein may be at about 5° C. to about 75° C. The binder removal treatment, the sintering treatment, and the annealing treatment may be performed sequentially or independently.

Optionally, the third and fourth surfaces of the capacitor body may be subjected to surface treatment such as sand blasting, laser irradiation, or barrel polishing. This surface treatment may expose ends of the first and second internal electrodes onto the outermost surfaces of the third and fourth surfaces, which may solidify electrical bonding between the first and second external electrodes and the first and second internal electrodes and easily forming alloy portions.

Subsequently, a paste for forming a sintered metal layer is coated on the outside of the obtained capacitor body and sintered to form sintered metal layers as the external electrodes.

The paste for forming a sintered metal layer may include a conductive metal and glass. The conductive metal and the glass are the same as aforementioned above and thus will not be repetitively mentioned. In addition, the paste for forming a sintered metal layer may optionally include a subcomponent such as a binder, solvent, dispersant, plasticizer, or oxide powder. For example, the binder may be ethylcellulose, acrylic, or butyral, and the solvent may be an organic solvent such as terpineol, butyl carbitol, alcohol, methyl ethyl ketone, acetone, or toluene, or an aqueous solvent.

A method of coating the paste for forming a sintered metal layer on the outside of the capacitor body may include various printings such as dipping, or screen printing and the like, coating by using a dispenser, etc., spraying using a spray, and the like. The paste for forming a sintered metal layer is coated at least on the third and fourth surfaces of the capacitor body and optionally, each portion of the first surface, the second surface, the fifth surface, or the sixth surface where band portions of the first and second external electrodes are formed.

Subsequently, the capacitor body, which is coated with the paste for forming a sintered metal layer, is dried and sintered at about 700° C. to about 1000° C. for about 0.1 hour to about 3 hours to form the sintered metal layers.

Optionally, on the outside of the obtained capacitor body, a paste for forming a conductive resin layer is coated and cured to form a conductive resin layer.

The paste for forming the conductive resin layer may include a resin and, optionally, a conductive metal or a non-conductive filler. Because the descriptions of the conductive metal and resin are the same as described above, repetitive description will be omitted. Additionally, the paste for forming the conductive resin layer may optionally include a subcomponent such as a binder, solvent, dispersant, plasticizer, or oxide powder. For example, the binder may be ethylcellulose, acrylic, or butyral, and the solvent may be an organic solvent such as terpineol, butyl carbitol, alcohol, methyl ethyl ketone, acetone, or toluene, or an aqueous solvent.

For example, a method of forming the conductive resin layer may include dipping the capacitor body 110 in the paste for forming a conductive resin layer and curing it, or printing the paste for forming a conductive resin layer on the surface of the capacitor body 110 in screen printing, gravure printing, etc. or coating and coating the paste for forming a conductive resin layer on the surface of the capacitor body 110 and then, curing it.

Subsequently, the plating layer is formed on the outside of the conductive resin layer.

For example, the plating layer may be formed in a plating method, for example, by sputtering or electric deposition.

Hereinafter, specific examples of the disclosure will be presented. However, the following examples are intended only to specifically illustrate or describe the disclosure, and should not be construed as limiting the scope of the disclosure.

EXAMPLES

Example 1

A dielectric green sheet was prepared by preparing dielectric slurry including $BaTiO_3$ and then, coating the dielectric slurry with a head discharge-type on-roll coater. Subsequently, a conductive paste for an internal electrode including $Ti_2SnC$ was prepared.

The conductive paste was printed on the surface of the dielectric green sheet, and the dielectric green sheets (width×length×height=3.2 mm×2.5 mm×2.5 mm) with the conductive paste layer were in stacked and compressed to manufacture a dielectric green sheet laminate.

The dielectric green sheet laminate was plasticized at 400° C. or less under a nitrogen atmosphere and sintered at 1300° C. or less at a hydrogen ($H_2$) concentration of 1.0% or less to manufacture a multilayered capacitor according to Example 1.

After curing the multilayered capacitor according to Example 1 by placing it in an epoxy mixture, the L-axis and T-axis direction sides of the capacitor body were polished to the ½ point in a W-axis direction, and then, cut in the L-axis direction and the T-axis direction from the center of the W-axis direction of the capacitor body to prepare a cross-sectional sample. Next, the cross-sectional sample was observed with a scanning electron microscope (SEM) and SEM-EDS analysis was performed to confirm that Sn is observed at the dielectric grain boundary.

Comparative Example 1

A multilayered capacitor according to Comparative Example 1 is manufactured in the same manner as in Example 1 except that the conductive paste for an internal electrode is prepared by including Ni and a sintering aid ($BaTiO_3$) instead of $Ti_2SnC$.

Comparative Example 2

A multilayered capacitor according to Comparative Example 2 is manufactured in the same manner as in Example 1 except that the conductive paste for an internal electrode is prepared by including $Ti_3AlC_2$ instead of $Ti_2SnC$.

EVALUATION EXAMPLES

Evaluation Example 1: Size Evaluation in the T-Axis Direction

Each of the multilayered capacitors according to Example 1 and Comparative Examples 1 and 2 was measured with respect to a size in a T-axis direction.

In addition, each of the multilayered capacitors was measured with respect to a thickness in the T-axis direction at the center of a L-axis direction. The thickness in the T-axis direction was measured in 50 of the multilayered capacitors, which were used to calculate an arithmetic mean.

The measurements of Example 1 and Comparative Example 2 were converted into a relative ratio (%) based on 100% of that of Comparative Example 1, and the results are shown in Table 1.

Evaluation Example 2: Reliability (MTTF) Evaluation

The multilayered capacitors of Example 1 and Comparative Examples 1 and 2 were evaluated with respect to reliability (MTTF (Mean Time To Failure)).

After preparing 400 samples of each of the multilayered capacitor sample according to Example 1 and Comparative Examples 1 and 2, a high-temperature load test was conducted on the samples under conditions of 125° C. and 8 V to check when insulation resistance reached 10 kΩ or less, which was obtained as MTTF.

After checking MTTF for the 400 samples, MTTFs of Example 1 and Comparative Example 2 are converted into a relative ratio based on 100% of that of Comparative Example 1.

If the MTTF was 80% to 90% of that of Comparative Example 1 'Δ' was given, '○' corresponded to 90 to 100% of the MTTF of Comparative Example 1, and '◎' corresponded to 100 to 110% of the MTTF of Comparative Example 1, and the results are shown in Table 1.

TABLE 1

| | Structure of internal electrode | Size ratio in T axis direction | Reliability |
|---|---|---|---|
| Comparative Example 1 | Ni + sintering aid | 100% | ○ |
| Comparative Example 2 | $Ti_3AlC_2$ | 92.8% | Δ |
| Example 1 | $Ti_2SnC$ | 92.4% | ◎ |

Referring to able, the multilayered capacitor of Example including $Ti_2SnC$, a MAX phase compound, including Sn, which may prevent thickening of a dielectric layer, turns out to have a relatively smaller size in the T-axis direction (thickness direction).

In addition, because Sn included in $Ti_2SnC$ moves to grain boundaries of the dielectric layer during the sintering process, the capacitor also exhibited very excellent reliability.

On the contrary, the multilayered capacitor of Comparative Example 1, which used an internal electrode conventionally manufactured to include Ni and a sintering aid without using the MAX phase compound, exhibited a relatively large size in the T-axis direction (thickness direction).

In addition, the multilayered capacitor of Comparative Example 2, which used an internal electrode manufactured by including the MAX phase compound including no Sn, and thus no Sn is present on grain boundaries of the dielectric layer, exhibits degraded reliability.

While this disclosure has been described in connection with what is presently considered to be practical example embodiments, it is to be understood that the disclosure is not limited to the disclosed example embodiments. On the contrary, it is intended to cover various modifications and equivalent arrangements included within the spirit and scope of the appended claims.

What is claimed is:

1. A multilayered capacitor, comprising a capacitor body including a dielectric layer and an internal electrode, and an external electrode disposed outside the capacitor body, wherein the dielectric layer includes a plurality of dielectric grains, and a grain boundary between at least two of the dielectric grains, the grain boundary includes Sn, the internal electrode includes a compound represented by Chemical Formula 1:

$M_{n+1}SnX_n$ [Chemical Formula 1]

wherein in Chemical Formula 1,

M includes Ti, Zr, Hf, Sc, Cr, V, Nb, Ta, Mo, Mn, or a combination thereof,

X includes C, N, or a combination thereof, and n is an integer from 1 to 4.

2. The multilayered capacitor of claim 1, wherein M includes Ti, Zr, Hf, Nb, or a combination thereof.

3. The multilayered capacitor of claim 1, wherein the compound represented by Chemical Formula 1 includes $Ti_2SnC$, $Zr_2SnC$, $Nb_2SnC$, $Hf_2SnC$, $Hf_2SnN$, $Ti_3SnC_2$, or a combination thereof.

4. The multilayered capacitor of claim 1, wherein a Sn content of the grain boundary is about 0.01 at % to about 0.5 at %.

5. The multilayered capacitor of claim 1, wherein at least one dielectric grain among the plurality of dielectric grains includes a main component and a subcomponent, and the main component includes $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), or a combination thereof.

6. The multilayered capacitor of claim 5, wherein the subcomponent includes dysprosium (Dy), manganese (Mn), vanadium (V), silicon (Si), aluminum (Al), barium (Ba), magnesium (Mg), antimony (Sb), germanium (Ge), and gallium, (Ga), indium (In), lanthanum (La), chromium (Cr), hafnium (Hf), yttrium (Y), actinium (Ac), cerium (Ce), praseodymium (Pr), neodium (Nd), promethium (Pm), samarium (Sm), europium (Eu), gadolinium (Gd), terbium (Tb), holmium (Ho), erbium (Er), thulium (Tm), ytterbium (Yb), lutetium (Lu), or a combination thereof.

7. The multilayered capacitor of claim 1, wherein an average thickness of the internal electrode is about 0.05 μm to about 1 μm.

8. The multilayered capacitor of claim 1, wherein an average thickness of the dielectric layer is about 0.5 μm to about 5 μm.

9. A multilayered capacitor, comprising a capacitor body including a dielectric layer and an internal electrode, and an external electrode disposed outside the capacitor body, the dielectric layer includes a plurality of dielectric grains, and a grain boundary between at least two of the dielectric grains, the grain boundary includes Sn, the grain boundary or at least one dielectric grain among the plurality of dielectric grains includes a main component and a subcomponent, and the internal electrode includes a compound represented by Chemical Formula 1:

$M_{n+1}SnX_n$ [Chemical Formula 1]

wherein, in Chemical Formula 1,

M includes Ti, Zr, Hf, Sc, Cr, V, Nb, Ta, Mo, Mn, or a combination thereof,

X includes C, N, or a combination thereof, and n is an integer from 1 to 4.

10. The multilayered capacitor of claim 9, wherein M includes Ti, Zr, Hf, Nb, or a combination thereof.

11. The multilayered capacitor of claim 9, wherein the compound represented by Chemical Formula 1 includes $Ti_2SnC$, $Zr_2SnC$, $Nb_2SnC$, $Hf_2SnC$, $Hf_2SnN$, $Ti_3SnC_2$, or a combination thereof.

12. The multilayered capacitor of claim 9, wherein a Sn content of the grain boundary is about 0.01 at % to about 0.5 at %.

13. The multilayered capacitor of claim 9, wherein the main component includes $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), or a combination thereof.

14. The multilayered capacitor of claim 9, wherein the subcomponent includes vanadium (V), silicon (Si), aluminum (Al), barium (Ba), magnesium (Mg), antimony (Sb), germanium (Ge), and gallium, (Ga), indium (In), lanthanum (La), chromium (Cr), hafnium (Hf), yttrium (Y), actinium (Ac), cerium (Ce), praseodymium (Pr), neodium (Nd), promethium (Pm), samarium (Sm), europium (Eu), gadolinium (Gd), terbium (Tb), holmium (Ho), erbium (Er), thulium (Tm), ytterbium (Yb), lutetium (Lu), or a combination thereof.

15. The multilayered capacitor of claim 9, wherein an average thickness of the internal electrode is about 0.05 μm to about 1 μm.

16. The multilayered capacitor of claim 9, wherein an average thickness of the dielectric layer is about 0.5 μm to about 5 μm.

17. The multilayered capacitor of claim 9, wherein the grain boundary includes the main component and the subcomponent.

18. The multilayered capacitor of claim 9, wherein M includes Ti, and X includes C.

19. The multilayered capacitor of claim 9, wherein the compound represented by Chemical Formula 1 includes $Ti_2SnC$.

* * * * *